US008580431B2

(12) United States Patent
Roev et al.

(10) Patent No.: US 8,580,431 B2
(45) Date of Patent: Nov. 12, 2013

(54) POROUS CARBONACEOUS COMPOSITE MATERIAL, POSITIVE ELECTRODE AND LITHIUM AIR BATTERY INCLUDING POROUS CARBONACEOUS COMPOSITE MATERIAL, AND METHOD OF PREPARING THE SAME

(75) Inventors: Victor Roev, Suwon-si (KR); Dong-min Im, Seoul (KR); Dong-joon Lee, Yongin-si (KR); Sang-bok Ma, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 13/556,423

(22) Filed: Jul. 24, 2012

(65) Prior Publication Data

US 2013/0029234 A1    Jan. 31, 2013

(30) Foreign Application Priority Data

Jul. 26, 2011   (KR) .................. 10-2011-0074122

(51) Int. Cl.
*H01M 4/02* (2006.01)
*H01M 4/13* (2010.01)
*H01M 4/60* (2006.01)

(52) U.S. Cl.
USPC ........................ 429/209; 429/212; 429/213

(58) Field of Classification Search
None
See application file for complete search history.

(56) References Cited

U.S. PATENT DOCUMENTS

| 6,099,960 A * | 8/2000 | Tennent et al. ............... 428/367 |
| 6,682,677 B2 * | 1/2004 | Lobovsky et al. ....... 264/172.11 |
| 6,780,388 B2 * | 8/2004 | Masuko et al. ............ 423/449.1 |
| 7,247,408 B2 * | 7/2007 | Skotheim et al. ........ 429/231.95 |
| 2007/0218367 A1 * | 9/2007 | Yamaguchi et al. .......... 429/232 |
| 2009/0186276 A1 * | 7/2009 | Zhamu et al. ................. 429/221 |
| 2011/0104571 A1 * | 5/2011 | Zhamu et al. ............ 429/231.95 |

FOREIGN PATENT DOCUMENTS

| JP | 2001313093 A | 11/2001 |
| JP | 2002110178 A | 4/2002 |
| KR | 1020030066614 A | 8/2003 |
| KR | 1020070064582 A | 6/2007 |
| WO | WO2010126767 A8 | 11/2010 |

OTHER PUBLICATIONS

Song et al., Nanostructured electrodes for lithium and lithium-air batteries: the latest developments challenges, and perspectives, Available online Jul. 20, 2011, Material Science and Engineering R 72 (2011) 219-252.*
Xiong et al., 3-D Nanotube Structures Used as High Performance Catalyst for Oxygen Reduction Reaction, Available online Oct. 15, 2010, J. Am. Chem. Soc. 2010, 132, 15839-15841.*
Chen et al., Enhanced stability of Pt electrocatalysts by nitrogen doping in CNTs for PEM fuel cells, Available online Sep. 10, 2009, Electrochemistry Communications 11 (2009) 2071-2076.*

(Continued)

*Primary Examiner* — Patrick Ryan
*Assistant Examiner* — Jose Colucci Rios
(74) *Attorney, Agent, or Firm* — Cantor Colburn LLP (57) ABSTRACT

A porous carbonaceous composite material including a core including a carbon nanotube (CNT); and a coating layer on the core, the coating layer including a carbonaceous material including a hetero element.

27 Claims, 2 Drawing Sheets (56) References Cited

OTHER PUBLICATIONS

Saha et al., 3-D compoisite electrodes for high performance PEM fuel cells composed of Pt supported on nitrogen-doped carbon nanotubes grown on carbon paper, Available online Dec. 13, 2008, Electrochemistry Communications 11 (2009) 438-441.*

Yongliang Li, Jiajun Wang, Xifei Li, Jian Liu, Dongsheng Geng, Jinli Yang, Ruying Li, Xueliang Sun, Nitrogen-doped carbon nanotubes as cathode for lithium air batteries, Electrochemistry Communications 13 (2011) 668-672.

Yi-Chun Lu et al., "The Influence of catalysts on Discharge and Charge Voltages of Rechargeable Li-Oxygen Batteries", Electrochemical and Solid-State Letters, 2010, vol. 13, Issue 6, pp. A69-A72.

* cited by examiner

POROUS CARBONACEOUS COMPOSITE MATERIAL, POSITIVE ELECTRODE AND LITHIUM AIR BATTERY INCLUDING POROUS CARBONACEOUS COMPOSITE MATERIAL, AND METHOD OF PREPARING THE SAME

CROSS-REFERENCE TO RELATED APPLICATIONS

This application claims priority to and the benefit of Korean Patent Application No. 10-2011-0074122, filed on Jul. 26, 2011, and all the benefits accruing therefrom under 35 U.S.C. §119, the content of which is incorporated herein in its entirety by reference.

BACKGROUND

1. Field

The present disclosure relates to a porous carbonaceous composite material, a positive electrode and a lithium air battery including the carbonaceous composite material, and methods of preparing the same.

2. Description of the Related Art

A lithium air battery generally includes a negative electrode capable of intercalating and deintercalating lithium ions, a positive electrode that oxidizes and reduces oxygen present in the air, and an electrolyte disposed between the negative and positive electrodes.

Since incorporation of oxygen at the positive electrode makes it unnecessary to store air within a positive active material, a lithium air battery may have high capacity. Lithium air batteries have high theoretical energy density, about 3500 watt-hours per kilogram (Wh/kg) or greater, which is about ten times higher than that of lithium ion batteries.

However, because of polarization from a high overvoltage during charging and discharging, existing lithium air batteries have considerably lower energy efficiency than lithium ion batteries.

To lower the charge-discharge overvoltage, various kinds of catalysts have been used; however, the effects thereof have not been sufficient. For example, Li et al. (Yongliang Li et al., Nitrogen-doped carbon nanotubes as cathode for lithium-air batteries, Electrochemistry Communications, 13 (2011) 668-672, the content of which in its entirety is herein incorporated by reference) discloses a lithium air battery including a positive electrode including a carbon nanotube (CNT) doped with nitrogen (N); however, its energy efficiency is also low.

Therefore, there remains a need for materials and methods that further reduce the charge-discharge overvoltage to provide higher charge-discharge energy efficiency.

SUMMARY

Provided is a porous carbonaceous composite material having a new structure.

Provided is a porous positive electrode including the porous carbonaceous composite material.

Provided is a lithium air battery including the positive electrode.

Provided are methods of preparing the porous carbonaceous composite material.

Additional aspects will be set forth in part in the description which follows and, in part, will be apparent from the description.

According to an aspect, a porous carbonaceous composite material includes a core including a carbon nanotube (CNT); and a coating layer on the core, the coating layer including a carbonaceous material comprising a hetero element.

According to another aspect, a positive electrode includes the porous carbonaceous composite material; and a binder, wherein the positive electrode is effective to reduce oxygen.

According to another aspect, a lithium air battery includes a negative electrode capable of intercalating and deintercalating lithium ions; the positive electrode; and an electrolyte disposed between the negative electrode and the positive electrode.

According to another aspect, disclosed is a method of preparing a porous carbonaceous composite material, the method including contacting a carbon nanotube (CNT) and a carbon precursor including a hetero element to prepare a mixture; and sintering the mixture to prepare the porous carbonaceous composite material.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Hereinafter, a porous carbonaceous composite material, a positive electrode and a lithium air battery including the porous carbonaceous composite material, and a method of preparing the porous carbonaceous composite material and the lithium air battery will be further described with regard to exemplary embodiments and with reference to the attached drawings. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout. As used herein, the term "and/or" includes any and all combinations of one or more of the associated listed items.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, "a first element," "component," "region," "layer," or "section" discussed below could be termed a second element, component, region, layer, or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

A "hetero element" as used herein refers to an element of Groups 13 to 16 of the Periodic Table of the Elements.

A porous carbonaceous composite material according to an embodiment includes a carbon nanotube (CNT) and a modified carbonaceous material comprising (e.g., doped with) a hetero element. The porous carbonaceous composite material is a composite of the CNT and the modified carbonaceous material. The CNT is unmodified.

A general lithium air battery may use either an aqueous electrolyte or an organic electrolyte. A reaction mechanism of a lithium air battery using an organic electrolyte may be given by Reaction Scheme 1 below.

Reaction Scheme 1

During discharge, lithium from a negative electrode reacts with oxygen, which is reduced on a positive electrode, and lithium oxide is formed as a result of an oxygen reduction reaction (ORR). On the contrary, during charge, the lithium oxide is oxidized to produce an oxygen as a result of an oxygen evolution reaction (OER).

During discharge, lithium peroxide ($Li_2O_2$) is deposited in pores of the positive electrode, and the amount of the deposited $Li_2O_2$ can effectively determine the capacity of the lithium air battery. However, the deposited $Li_2O_2$ is difficult to oxidize during charge. Accordingly, during charge, an overvoltage can be applied to facilitate oxidation of the deposited $Li_2O_2$. Generally, a catalytic material is added into the positive electrode to reduce the overvoltage.

While not wanting to be bound by theory, it is understood that the porous carbonaceous composite material may reduce the overvoltage without adding a separate catalytic material. That is, the hetero element contained in the carbonaceous material may serve as a catalyst and thus the carbonaceous material can reduce the overvoltage during charge and discharge. Thus, the porous carbonaceous composite material may be used as a catalyst and/or a catalyst support at the positive electrode of the lithium air battery.

Hereinafter, an exemplary mechanism by which the porous carbonaceous composite material increases an energy efficiency of the lithium air battery will now be described in detail. The description is for illustrative purposes only and this theory shall not limit the scope of the present disclosure.

Since the CNT included in the porous carbonaceous composite material has high conductivity, it is relatively easy to transfer electrons from an active site of the carbonaceous material, where oxygen oxidation/reduction occurs, to a current collector via the CNT. In addition, it is also relatively easy to transfer oxygen and an electrolyte to the active site through pores formed in the CNT. Thus, since oxygen supply and electron transfer are easily performed, the reversibility of the oxygen oxidation/reduction reaction may be increased. As a result, the energy efficiency of the lithium air battery may be increased.

Figure 2:
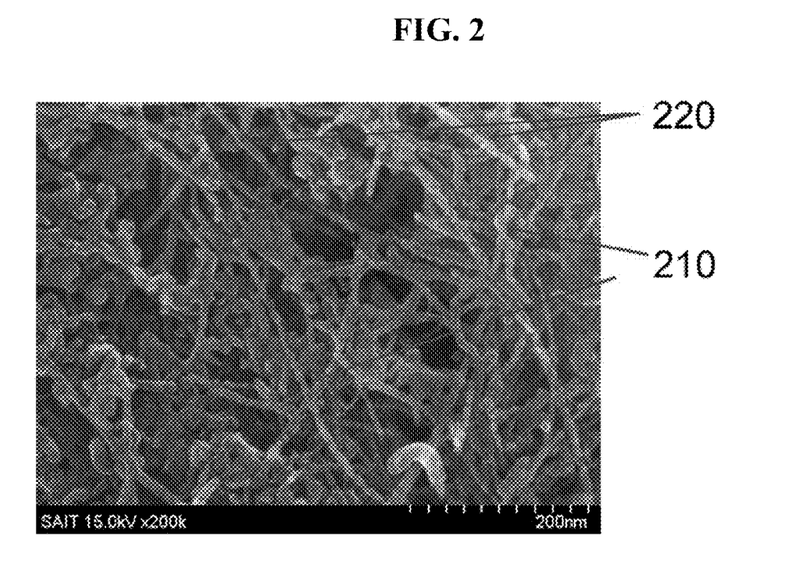
FIG. 2 shows a scanning electron microscope (SEM) image of a porous carbonaceous composite material according to Example 1.

For example, the porous carbonaceous composite material may include a core including the CNT, and a coating layer formed on at least one portion of the core, wherein the coating layer may include the carbonaceous material which comprises the hetero element. That is, the carbonaceous material comprising the hetero element of the porous carbonaceous composite material may be disposed (e.g., coated on) at least a portion of the core including the CNT. A shape of the coating layer is not particularly limited. As shown in FIG. 2, the coating layer may have various shapes, such as uniform or non-uniform shape. For example, the coating layer may protrude from a surface of the CNT. The non-uniform coating layer may increase a contact area with an electrolyte.

In addition, the core may include a plurality of the CNTs and the CNTs may define a pore therebetween. That is, the core may have a porous structure by including the plurality of CNTs and the pores may be between the CNTs. A coating layer disposed (e.g., formed) on the CNTs may attach the CNTs to each other. The pores between the CNTs may increase a contact area with an electrolyte.

The modified carbonaceous material may include, but is not limited to, at least one selected from a carbon nanoparticle, mesoporous carbon, a CNT, a carbon nanofiber, a carbon nanosheet, a carbon nanorod, a carbon nanobelt, and a combination thereof. Any carbonaceous material available in the art may be used as long as the carbonaceous material comprises the hetero element and has sufficient conductivity.

For example, the carbonaceous material may be a modified carbon nanoparticle. That is, an agglomerate of the carbonaceous material comprising the hetero element may constitute a carbonaceous coating layer.

An average diameter of the carbon nanoparticle may be about 2 nanometers (nm) to about 900 nm, specifically about 4 nm to about 500 nm. For example, the average diameter of the carbon nanoparticles may be about 2 nm to about 30 nm. When the average diameter of the carbon nanoparticles is within this range, the energy efficiency of the lithium air battery may be further increased.

The modified carbonaceous material may be a sintered material of a carbon precursor including the hetero element. For example, the carbon nanoparticle doped with the hetero elements may be obtained by sintering the carbon precursor including the hetero element.

The hetero element may include at least one selected from a Group 13 to 16 element, wherein "Group" is a Group of the Periodic Table. For example, the hetero element may include, but is not limited to, at least one selected from nitrogen (N), sulfur (S), phosphorus (P), selenium (Se), tellurium (Te), and boron (B). The hetero element may be any hetero element that facilitates oxidation/reduction reaction of oxygen.

The amount of the hetero element disposed in (e.g., doped on) the coating layer, when calculated from a peak area of the hetero element and a peak area of carbon obtained by X-ray photoelectron spectroscopy (XPS), may be 30 weight percent (wt %) or less. For example, the amount of the hetero element may be about 0.01 wt % to about 30 wt %, specifically about 0.1 wt % to about 20 wt %, based on the total weight of the coating layer. When the amount of the hetero element is in this range, the energy efficiency of the lithium air battery may be further increased.

The CNT may include at least one selected from a single walled CNT, a dual walled CNT, and a multi walled CNT. In addition, the CNT may include at least one selected from a semiconducting CNT and a metallic CNT.

An average pore size (4V/A) of the porous carbonaceous composite material, when measured by a Brunauer-Emmett-Teller ("BET") method may be 7 nm or greater. For example, the average pore size (4V/A) of the porous carbonaceous composite material as the value measured by using the BET method may be about 7 nm to about 50 nm. For example, the average pore size (4V/A) of the porous carbonaceous composite material as the value measured by the BET method may be in a range of about 7 nm to about 30 nm. When the average pore size (4V/A) of the porous carbonaceous composite material is excessively small, it is difficult to ensure wetting of an electrolyte. When the average pore size (4V/A) of the porous carbonaceous composite material is excessively large, a surface area of the porous carbonaceous composite material may be reduced and thus electrochemical activity of the porous carbonaceous composite material may be reduced.

A specific surface area of the porous carbonaceous composite material, when measured by a BET method, may be 45 square meters per gram ($m^2/g$) or more. For example, the specific surface area of the porous carbonaceous composite material, when measured by the BET method, may be about 45 $m^2/g$ to about 900 $m^2/g$. For example, the specific surface area of the porous carbonaceous composite material, when measured by the BET method, may be about 45 $m^2/g$ to about 390 $m^2/g$. When the specific surface area is excessively small, the electrochemical activity of the porous carbonaceous composite material may be reduced.

According to another embodiment, a positive electrode may include the above-described porous carbonaceous composite material, and a binder, wherein oxygen is used as a positive active material. The positive electrode includes the porous carbonaceous composite material, thereby lowering overvoltage during charging and discharging of the lithium air battery.

An average pore size of the positive electrode, when measured by the BET method, may be 10 nm or more. For example, the average pore size of the positive electrode, when measured by the BET method, may be about 10 nm to about 50 nm. For example, the average pore size of the positive electrode, when measured by the BET method, may be about 10 nm to about 30 nm. When the average pore size of the positive electrode is excessively small, it is difficult to ensure wetting of an electrolyte. When the average pore size of the positive electrode is excessively large, a surface area of the positive electrode may be reduced and thus an electrochemical activity of the positive electrode may be reduced.

A specific surface area of the positive electrode, when measured by the BET method, may be 50 $m^2/g$ or more. For example, the specific surface area of the positive electrode, when measured by the BET method, may be about 50 $m^2/g$ to about 400 $m^2/g$. For example, the specific surface area of the positive electrode, when measured by the BET method, may be about 50 $m^2/g$ to about 180 $m^2/g$. When the specific surface area is excessively small, the electrochemical activity of the positive electrode may be reduced.

The positive electrode may further include an additional oxygen oxidation/reduction catalyst. For example, the additional catalyst may include at least one selected from a metal, a metal oxide, and an organometallic compound. Also, the additional catalyst may be in the form of a particle.

The metal may include at least one selected from cobalt (Co), nickel (Ni), iron (Fe), gold (Au), silver (Ag), platinum (Pt), ruthenium (Ru), rhodium (Rh), osmium (Os), iridium (Ir), palladium (Pd), copper (Cu), manganese (Mn), titanium (Ti), vanadium (V), tungsten (W), molybdenum (Mo), niobium (Nb), and an alloy thereof. The metal oxide may include, but is not limited to, at least one selected from manganese oxide, cobalt oxide, iron oxide, zinc oxide, nickel oxide, vanadium oxide, molybdenum oxide, niobium oxide, titanium oxide, tungsten oxide, chrome oxide. In an embodiment the metal oxide may be present in the form of a composite of at least one of the foregoing oxides. The organometallic compound may include, but is not limited to, an aromatic heterocyclic compound that is coordinated to transition metal. The organometallic compound may be any organometallic compound that is available in the art.

For example, the oxidation/reduction catalyst may include at least one selected from tungsten carbide (WC), WC fused cobalt, $CoWO_4$, $FeWO_4$, $NiS$, $WS_2$, $La_2O$, $Ag_2O$, and cobalt phthalocyanine, and the like.

An example of a method of manufacturing the positive electrode is as follows.

The porous carbonaceous composite material and a binder may be contacted to provide a mixture, and then the mixture may be added to an appropriate solvent to prepare a positive electrode slurry. The positive electrode slurry may be coated and dried on a surface of a current collector, optionally followed by press-molding to improve electrode density, thereby providing the positive electrode.

The binder may include a thermoplastic resin or a thermocurable resin. Examples of the binder include, but are not limited to, at least one selected from polyethylene, polypropylene, polytetrafluoroethylene (PTFE), polyvinylidene fluoride (PVdF), styrene-butadiene rubber, a tetrafluoroethylene-perfluoroalkylvinylether copolymer, a vinylidene fluoride-hexafluoropropylene copolymer, a vinylidene fluoride-chlorotrifluoroethylene copolymer, an ethylene-tetrafluoroethylene copolymer, polychlorotrifluoroethylene, a fluorovinylidene-pentafluoro propylene copolymer, a propylene-tetrafluoroethylene copolymer, an ethylene-chlorotrifluoroethylene copolymer, a vinylidene fluoride-hexafluoropropylene-tetrafluoroethylene copolymer, a vinylidene fluoride-perfluoromethylvinylether-tetrafluoro ethylene copolymer, and an ethylene-acrylic acid copolymer. The foregoing examples may be used alone or in a combination. Any appropriate binder available in the art may be used.

The solvent may comprise at least one selected from N-methyl pyrolidinone (NMP), an alcohol such as ethanol, propanol, isopropanol, butanol, or isobutanol, an acetate such as methyl acetate, ethyl acetate, or butyl acetate, acetonitrile, a ketone such as acetone, a glycol such as ethylene glycol, hexylene glycol, diethylene glycol, or ethylene glycol monoethyl ether, xylene, or a halogenated hydrocarbon such as methylene dichloride, chloroform, carbon tetrachloride, or ethylene dichloride, water, or a combination thereof.

A porous body in a matrix or mesh form may be used as the current collector to facilitate diffusion of oxygen. A porous metal plate made of, for example, stainless steel, nickel, or aluminum may be used. Materials for the current collector are not particularly limited, and any appropriate material for current collectors available in the art may be used. The current collector may be coated with an anti-oxidation metal or alloy to prevent oxidation.

The positive electrode slurry may further include an additional oxygen oxidation/reduction catalyst and a conductive material. In addition, the positive electrode slurry may further include lithium oxide.

Any material may be used as the conductive material without limitation as long as it has sufficient porosity and conductivity. For example, a porous carbon-based material may be used. Examples of the carbon-based material include at least one selected from carbon black, graphite, graphene, activated carbon, and carbon fibers. Metallic conductive materials, including metal fibers and metal meshes, may be used. Metal powders of copper, silver, nickel, aluminum, and the like may be used. Organic conductive materials, such as polyphenylene derivatives, may be used. The above-listed conductive materials may be used alone or in a combination.

According to another embodiment, a lithium air battery includes a negative electrode capable of intercalating and deintercalating lithium ions, the above-described positive electrode, and an electrolyte disposed between the negative and positive electrodes.

Energy efficiency of the lithium air battery, as calculated by Equation 1 below with respect to measurements obtained in a fifth charge and discharge cycle in ambient dry air (having a dew point of −80° C.) at a constant current of 0.21 mA/cm$^2$ at room temperature (20° C.) at 1 atmosphere using a voltage of about 2.2 V to about 4.3 V based on lithium metal, may be 74% or more:

Energy Efficiency[%]=$E$(discharge)/$E$(charge)×100%     (1)

In Equation 1, E(charge) is an average voltage during charge and E(discharge) is an average voltage during discharge. The E(charge) and the E(discharge) are calculated by integrating a charge curve and a discharge curve in an electric capacity (x axis)-voltage(y axis) graph to obtain integrated values and then dividing the integrated value by a maximum discharge capacity and maximum charge capacity, respectively.

Discharge capacity per unit weight of the positive electrode (i.e., specific discharge capacity) including oxygen in the fifth discharge cycle of the lithium air battery whose charge and discharge efficiency is being calculated may be 300 mAh/g, based on the total weight of the composite, carbon, binder, and oxygen, or more, at 2.2 V.

In an embodiment, the negative electrode capable of intercalating and deintercalating lithium ions of the lithium air battery may include lithium metal, a lithium metal-based alloy, or a material capable of accepting and releasing lithium. Materials for the negative electrode are not particularly limited to the foregoing, and any material including Li or capable of reversibly accepting and releasing lithium that is available in the art may be used. The negative electrode can determine the capacity of the lithium air battery. A negative electrode comprising lithium metal is specifically mentioned. Examples of the lithium-based alloy include alloys of lithium with at least one selected from aluminum (Al), tin (Sn), magnesium (Mg), indium (In), calcium (Ca), titanium (Ti), and vanadium (V).

The organic electrolyte of the lithium air battery may include an aprotic solvent. Examples of the aprotic solvent include a carbonate-based solvent, an ester-based solvent, an ether-based solvent, a ketone-based solvent, an amine-based solvent, and a phosphine-based solvent. Examples of the carbonate-based solvent include dimethyl carbonate (DMC), diethyl carbonate (DEC), ethyl methyl carbonate (EMC), dipropyl carbonate (DPC), methylpropyl carbonate (MPC), ethylpropyl carbonate (EPC), methyl ethyl carbonate (MEC), ethylene carbonate (EC), propylene carbonate (PC), and butylene carbonate (BC). Examples of the ester-based solvent include methyl acetate, ethyl acetate, n-propyl acetate, dimethyl acetate, methyl propionate, ethyl propionate, γ-butyrrolactone, decanolide, valerolactone, mevalonolactone, and caprolactone. Examples of the ether-based solvent include dibutyl ether, tetraglyme, diglyme, dimethoxyethane, 2-methyltetrahydrofuran, and tetrahydrofuran. An example of the ketone-based solvent is cyclohexanone. Examples of the amine-based solvent include triethyl amine and triphenylamine. An example of the phosphine-based solvent includes triethyl phosphine. However, any appropriate aprotic solvent available in the art may be used without limitation.

Examples of the aprotic solvent include a nitrile (such as R—CN, wherein R is a $C_2$-$C_{20}$ linear, branched, or cyclic hydrocarbon-based moiety that may include a double-bonded aromatic ring or an ether bond), an amide (such as dimethylformamide), dioxolanes (such as 1,3-dioxolane), and a sulfolane.

The aprotic solvent may be used alone or in a combination thereof. In the latter, a mixing ratio of the aprotic solvents may be selected to provide a desired performance of the battery. A suitable aprotic solvent may be selected by one of skill in the art without undue experimentation.

The organic electrolyte may include an ionic liquid. The ionic liquid may include a linear or branched substituted compound containing a cation, such as ammonium, imidazolium, pyrrolidinium, and piperidinium, and an anions such as $PF_6^-$, $BF_4^-$, $CF_3SO_3^-$, $(CF_3SO_2)_2N^-$, $(C_2F_5SO_2)_2N^-$, $(C_2F_5SO_2)_2N^-$, and $(CN)_2N^-$.

The organic electrolyte may include at least one selected from an alkali metal salt and an alkali earth metal salt. The at least one of the alkali metal salt and the alkali earth metal salt may be dissolved in an organic solvent, and may be used as a source of at least one of alkali metal ions and alkali earth metal ions in the lithium air battery. The salt may facilitate migration of the alkali metal ions and/or alkali earth metal ions between the positive and negative electrodes.

For example, cations of the alkali metal salt and/or alkali earth metal salt may include lithium ions, sodium ions, magnesium ions, potassium ions, calcium ions, rubidium ions, strontium ions, cesium ions, barium ions, and the like.

Anions of the alkali metal salt and/or alkali earth metal salt in the organic electrolyte may include at least one ion selected from $PF_6^-$, $BF_4^-$, $SbF_6^-$, $AsF_6^-$, $C_4F_9SO_3^-$, $ClO_4^-$, $AlO_2^-$, $AlCl_4^-$, $C_xF_{2x+1}SO_3^-$ (wherein x is a natural number), $(C_xF_{2x+1}SO_2)(C_yF_{2y+1}SO_2)N^-$ (wherein x and y are natural numbers), and halide.

The at least one of the alkali metal salt and the alkali earth metal salt may include, but is not limited to, at least one selected from $LiPF_6$, $LiBF_4$, $LiSbF_6$, $LiAsF_6$, $LiN(SO_2C_2F_5)_2$, $Li(CF_3SO_2)_2N$, $LiC_4F_9SO_3$, $LiClO_4$, $LiAlO_2$, $LiAlCl_4$, $LiN(C_xF_{2x+1}SO_2)(C_yF_{2y+1}SO_2)$ (wherein x and y are natural numbers), LiF, LiBr, LiCl, LiI, and $LiB(C_2O_4)_2$ (LiBOB; lithium bis(oxalato) borate). Any appropriate alkali metal and alkali earth metal salts available in the art may be used.

In the organic electrolyte, the amount of the at least one of the alkali metal salt and the alkali earth metal salt may be from about 100 millimolar (mM) to about 10 molar (M), and in an embodiment, may be from about 500 mM to about 2 M. The amount of the salt is not particularly limited, as long as the organic electrolyte may effectively transfer lithium ions and/or electrons during charge and discharge.

In addition, a separator may be disposed between the negative electrode and the positive electrode. Further, the separator, filled with an electrolyte, may be disposed between a lithium ion conductive solid electrolyte and the negative electrode, which is further disclosed below.

The separator may have any appropriate composition that is suitably durable in the environment of the lithium air battery. For example, the separator may comprise at least one selected from a polymeric non-woven fabric, such as a polypropylene non-woven fabric or a polyphenylene sulfide non-woven fabric, a porous olefin-base resin film, for example, including polyethylene or polypropylene.

A lithium ion conductive solid electrolyte membrane may be additionally disposed between the negative electrode and the organic electrolyte. The lithium ion conductive solid electrolyte membrane may serve as a protective layer which prevents water, which may be contained in an aqueous electrolyte, and foreign substances, such as oxygen, from directly reacting with lithium contained in the negative electrode. The lithium ion conductive solid electrolyte membrane may include at least one selected from an inorganic material, for example, a lithium ion conductive glass, and a lithium-ion conductive crystal (e.g., a ceramic or a glass-ceramic). Any appropriate material available in the art and having suitable lithium ion conductivity and capable of protecting the negative electrode may be used for the lithium ion conductivity solid electrolyte membrane. To provide sufficient chemical stability, the lithium ion conductive solid electrolyte membrane may include an oxide.

The lithium ion conductive crystal may comprise $Li_{1+x+y}(Al, Ga)_x(Ti, Ge)_{2-x}Si_yP_{3-y}O_{12}$, wherein $0 \leq x \leq 1$, and $0 \leq y \leq 1$, and in some embodiments, $0 \leq x \leq 0.4$, and $0 < y \leq 0.6$, and in some other embodiments, $0.1 \leq x \leq 0.3$, and $0.1 < y \leq 0.4$. Examples of the lithium ion conductive glass-ceramic include lithium-aluminum-germanium-phosphate (LAGP), lithium-aluminum-titanium-phosphate (LATP), lithium-aluminum-titanium-silicon-phosphate (LATSP), and the like.

In an embodiment, the lithium ion conductive solid electrolyte membrane may further include a polymer solid electrolyte, in addition to the glass-ceramic. The polymer solid electrolyte may be polyethylene oxide doped with a lithium salt. Examples of the lithium salt include $LiN(SO_2CF_2CF_3)_2$, $LiBF_4$, $LiPF_6$, $LiSbF_6$, $LiAsF_6$, $LiClO_4$, $LiCF_3SO_3$, $LiN(SO_2CF_3)_2$, $LiN(SO_2C_2F_5)_2$, $LiC(SO_2CF_3)_3$, $LiN(SO_3CF_3)_2$, $LiC_4F_9SO_3$, $LiAlCl_4$, and the like.

In an embodiment, the lithium ion conductive solid electrolyte membrane may further include an inorganic solid electrolyte, in addition to the glass-ceramic. Examples of the inorganic solid electrolyte include $Cu_3N$, $Li_3N$, LiPON, and the like.

An example of manufacturing of the lithium air battery is as follows.

First, a positive electrode including the porous carbonaceous composite material, a negative electrode capable of intercalating and deintercalating lithium ions, and a separator are prepared.

Next, the negative electrode is disposed on (e.g., mounted on) one side of a case, and the positive electrode with the separator is disposed on a side of the case opposite to the negative electrode, wherein the separator is disposed on a side of the positive electrode facing the negative electrode. An electrolyte is disposed (e.g., injected) between the positive electrode and the negative electrode, a porous current collector is disposed on the positive electrode, and a pressing member that allows air to reach the positive electrode and applies pressure is dispose to affix a cell, thereby completing the manufacturing of the lithium air battery. A lithium ion conductive solid electrolyte membrane may be further disposed on a surface of the negative electrode.

The case may be divided into upper and lower parts that contact the negative and positive electrodes, respectively. An insulating resin may be disposed between the upper and lower parts to electrically insulate the positive and negative electrodes from each other.

The lithium air battery may be either a lithium primary battery or a lithium secondary battery. The lithium air battery may have any of various shapes, and in some embodiments, may have a coin, button, sheet, stack, cylinder, plane, prismatic, or horn shape. The lithium air battery may be used as a large-scale battery for an electric vehicle.

Figure 1:
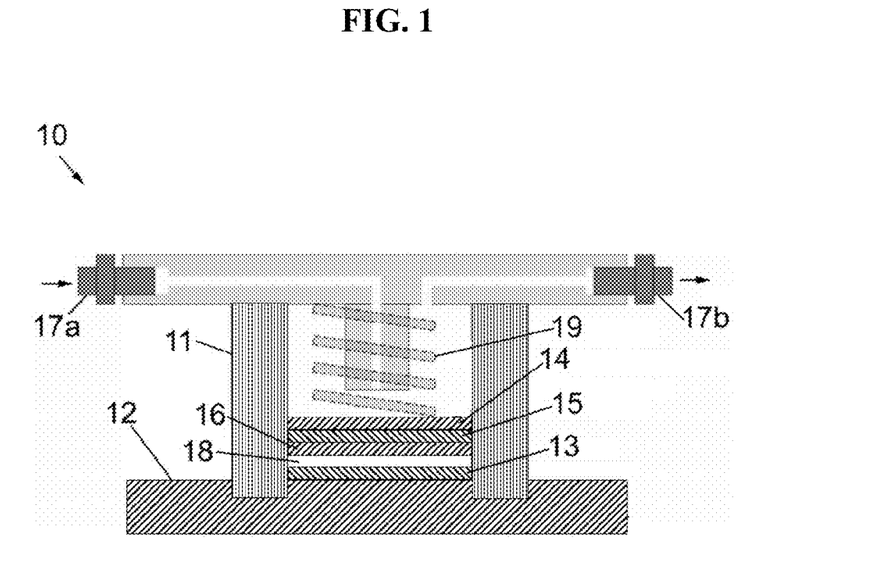
FIG. 1 is a schematic view of an embodiment of a lithium air battery.

FIG. 1 is a schematic view of a lithium air battery 10 according to an embodiment. The lithium air battery 10 includes a positive electrode 15, which uses oxygen as an active material and which is disposed on a first current collector 14. A negative electrode 13 including lithium contacts a second current collector 12, an organic electrolyte 18 is disposed between the positive electrode 15 and the negative electrode 13, and a separator 16 is disposed on a surface of the positive electrode 15. A lithium ion conductive solid electrolyte membrane (not shown) may be disposed on a surface of the negative electrode 13. The first current collector 14, which is porous, may serve as a gas diffusion layer. A pressing member 19, which allows air to reach the positive electrode 15, is disposed on the first current collector 14. A case 11, comprising an insulating resin, is interposed between the positive electrode 15 and the negative electrode 13 to thus electrically separate the positive electrode 15 and the negative electrode 13. The air may be supplied via an air inlet 17a and is discharged via an air outlet 17b.

As used herein, the term "air" is not limited to atmospheric air, and may refer to a combination of gases including oxygen, or pure oxygen gas. This broad definition of "air" also applies to other terms including "air battery" and "air electrode".

According to another embodiment, a method of preparing a porous carbonaceous composite material may include contacting a CNT and a carbon precursor including a hetero element to prepare a mixture, and sintering the mixture.

The preparing of the mixture may include mixing and drying the CNT and the carbon precursor including the hetero element in an aqueous solution or an organic solution.

The aqueous solution may have, but is not limited to, a pH of about 7 to about 14, specifically about 7.5 to about 13, by adding an acid or a base. The pH of the aqueous solution may be appropriately selected to manufacture a modified carbonaceous coating layer with a suitable specific surface area.

In addition, the organic solvent may be any organic solvent that is available in the art as long as the organic solvent may dissolve the CNT and the carbon precursor including the hetero element. An example of the organic solvent is pyridine.

The carbon precursor including the hetero element may include a substituted or unsubstituted aromatic cyclic compound and/or a substituted or unsubstituted aromatic heterocyclic compound. The aromatic cyclic compound includes an aromatic ring including carbon only, but not a hetero element. The aromatic cyclic compound and the aromatic heterocyclic compound may each include a substituent substituted with aromatic rings and/or aromatic heterocycle. The substituent may be any substituent that is available in the art without limitation as long as the substituent includes the hetero elements. An example of the substituent may be sulfonic acid.

For example, the carbon precursor including the hetero element may include at least one selected from quinoxaline, hemin, p-toluene sulfonic acid, porphyrin, cobalt-tetramethoxy-phenylporphyrin, iron-tetramethoxy-phenylporphyrin, phthalocyanine, cobalt-phthalocyanine, iron-phthalocyanine, pyrazine, and bipyridine.

For example, the sintering may be performed for about 1 hour to about 72 hours, specifically about 2 hours to about 50 hours, under an inert atmosphere at a temperature of about 400° C. to about 1000° C. The inert atmosphere may be, but is not limited to, nitrogen, argon, helium, or the like, and may be any atmosphere without an active gas. The sintering may be performed in a vacuum. The temperature and time for the sintering are not limited to the above-described ranges and may be appropriately determined to completely carbonize the carbon precursor and to increase a specific surface area of the porous carbonaceous composite material.

The preparation method may further include refining a sintered material obtained by the sintering. The refining is an operation of removing impurities that remain in the sintered material. The impurities are components causing a side reaction in a lithium air battery.

For example, the refining may include immersing the sintered material in a solvent comprising at least one of an aqueous hydrofluoric acid (HF) solution, an aqueous hydrochloric acid (HCl) solution, an aqueous nitric acid ($HNO_3$) solution, an aqueous hydrogen peroxide ($H_2O_2$) solution, an aqueous sulfuric acid solution, for example, for about 0.5 hours to about 24 hours, specifically about 1 to about 12 hours. A concentration and an immersing time of the solvent are not particularly limited and may be appropriately selected to remove the impurities and to increase the specific surface area of the porous carbonaceous composite material.

Hereinafter, one or more embodiments will be described in further detail with reference to the following examples. However, these examples are not intended to limit the purpose and scope of the disclosed embodiments.

Preparation of Porous Carbonaceous Composite Material

Example 1

0.7 grams (g) of a multi walled CNT (Xin nanomaterials, China) was mixed with 15 milliliters (mL) of a concentrated ammonia aqueous solution (24 weight percent, wt %) in which 0.3 g of Hemin is dissolved to prepare a uniform mixture using an incipient wetness impregnation method. The solvent was removed by drying the uniform mixture for 12 hours at room temperature to obtain a dried material. The dried material was sintered for 3 hours under a nitrogen atmosphere at 850° C. to obtain a sintered material. The sintered material was immersed in 30 wt % of HF for 1.5 hours at 25° C. to remove impurities and was filtered and washed three times. The washed sintered material was freeze-dried to obtain a porous carbonaceous composite material powder.

FIG. 2 shows a scanning electron microscope (SEM) image of the porous carbonaceous composite material. As shown in FIG. 2, the carbonaceous coating layer 210 is non-uniform and is doped with the hetero element is formed on a surface of a CNT 220. The carbonaceous coating layer may attach a plurality of CNTs to each other. Pores exist between the CNTs. The carbonaceous coating layer includes agglomerates of carbon nanoparticles doped with hetero elements.

Example 2

A porous carbonaceous composite material powder was prepared in the same manner as in Example 1, except that a dual walled CNT (Xin nanomaterials, China) was used instead of the multi walled CNT (Xin nanomaterials, China).

Example 3

A porous carbonaceous composite material powder was prepared in the same manner as in Example 1, except that a single walled CNT (Xin nanomaterials, China) was used instead of the multi walled CNT (Xin nanomaterials, China).

Example 4

A porous carbonaceous composite material powder was prepared in the same manner as in Example 1, except that p-toluene sulfonic acid was used instead of Hemin.

Example 5

A porous carbonaceous composite material powder was prepared in the same manner as in Example 1, except that cobalt phthalocyanine tetracarboxylic acid was used instead of Hemin.

Reference Example 1

0.5 g of Hemin and 7 g of mesoporous silica template (OMS Model MSU-1, self production) were dissolved in 15 mL and were stirred. The solvent was removed by drying the resulting solution for 12 hours at room temperature to obtain a dried material. The dried material was sintered for 3 hours under a nitrogen atmosphere at 850° C. The sintered material was immersed in 50 wt % of a HF aqueous solution, was separated and washed, and dried in the air for 12 hours to prepare a nitrogen-doped carbon nanoparticle powder.

Comparative Example 1

A dual walled CNT (Xin nanomaterials, China) itself was used as a porous material.

Preparation of Positive Electrode

Example 6

The porous carbonaceous composite material powder prepared in Example 1 and a N-methyl pyrrolidone (NMP) solution in which 6 wt % of polyvinylidene fluoride (PVdF) was dissolved were mixed in a mortar for 15 minutes to prepare a positive electrode slurry. The positive electrode slurry was coated on a gas diffusion layer (SGL, BA35), was dried for 2 hours at 60° C., and was dried for 2 hours in a vacuum at 120° C.

A final amount of the PVdF included in the positive electrode without the gas diffusion layer was 10 wt %.

The positive electrode was partially cut to have a circular shape with an area of 1.13 $cm^2$ and was used to prepare a battery.

Examples 7 to 10

Positive electrodes of Examples 7 to 10 were prepared in the same manner as in Example 6, except that the porous carbonaceous composite materials prepared in Examples 2 through 5 were used, respectively.

Reference Example 2

A positive electrode was prepared in the same manner as in Example 6, except that the nitrogen-doped carbon nanoparticle powder prepared in Reference Example 1 was used.

Comparative Example 2

A positive electrode was prepared in the same manner as in Example 6, except that the dual walled CNT prepared in Comparative Example 1 was used. Preparation of lithium air battery

Example 11

The positive electrode prepared in Example 6, a lithium metal thin film as a negative electrode, and a stack structure of three sheets of Celgard-3501 formed of polypropylene and available in Celgard as a separator were used. 45 mL of a 1 M LiTFSI electrolyte solution obtained by dissolving lithium bis(trifluoromethanesulfonyl)imide) ("LiTFSI") in propylene carbonate ("PC") were injected to the separator.

The lithium metal thin film as the negative electrode was mounted in a stainless case. The separator is disposed on the negative electrode. The positive electrode prepared in Example 6 was disposed on the separator. Then, a stainless steel mesh was disposed on the positive electrode and a pressing member that allows air to reach the positive electrode applied pressure to affix a cell, thereby completing manufacture of a lithium air battery. The stainless case might be divided into a lower portion that contacts the negative electrode and an upper electrode that contacts the positive electrode. An insulating resin was interposed between the upper and lower portions to electrically insulate the positive electrode and the negative electrode from each other. An example of the lithium air battery is shown in FIG. 1.

Examples 12 to 15

Lithium air batteries of Examples 12 to 15 were prepared in the same manner as in Example 11, except that the positive electrodes prepared in Examples 6 to 10 were used, respectively.

Reference Example 3

A lithium air battery was prepared in the same manner as in Example 11, except that the positive electrode prepared in Reference Example 2 was used.

Comparative Example 3

A lithium air battery was prepared in the same manner as in Example 11, except that the positive electrode prepared in Comparative Example 2 was used.

Evaluation Example 1

Evaluation of Porosity

BET specific surface areas and pore size distributions (4V/A by BET) of the materials prepared in Examples 1 to 5, Reference Example 1, and Comparative Example 1, and the positive electrodes prepared in Examples 6 to 10, Reference Example 2, and Comparative Example 2 were measured by using a Brunauer-Emmett-Teller (BET) method and a Barrett-Joyner-Halenda (BJT) method. Evaluation of micropores and external surface areas was performed by using a t-plot method. The evaluation results are partially shown in Table 1 below.

TABLE 1

|  | BET specific surface area [$m^2/g$] | Average pore size (4 V/A by BET) [nm] |
|---|---|---|
| Comparative Example 1 | 399.4 | 13.9 |
| Example 1 | 179.1 | 23.4 |
| Example 2 | 274.9 | 13.3 |
| Comparative Example 2 | 189.1 | 17.9 |
| Example 6 | 130.4 | 21.1 |
| Example 7 | 158 | 18.6 |

As shown in Table 1, the porous carbonaceous composite materials prepared in Examples 1 and 2 have smaller BET specific surface areas than the CNT of Comparative Example 1, but have similar or greater average pore sizes than the CNT of Comparative Example 1.

The porous carbonaceous composite materials of Examples 1 and 2 have BET specific surface areas and average pore sizes that are surprisingly increased when compared with a BET specific surface area of 40.9 $m^2/g$ and an average pore size of 7.3 nm, which are disclosed in by Li et al. (Yongliang Li et al., Nitrogen-doped carbon nanotubes as cathode for lithium-air batteries, Electrochemistry Communications 13 (2011) 668-672).

In addition, the positive electrodes of Examples 6 and 7 have smaller BET specific areas and greater average pore sizes than the positive electrode of Comparative Example 2.

Evaluation Example 2

Evaluation of Charge/Discharge Characteristics

The lithium air batteries prepared in Examples 11 to 15, Reference Example 3, and Comparative Example 3 were discharged at a constant current of 0.2 $mA/cm^2$ at 25° C. and 1 atmosphere (atm) to a voltage of 2.2 V (with respect to Li), and charged at the same current to a voltage of 4.5 V. This charging and discharging cycle was performed five times.

Figure 3:
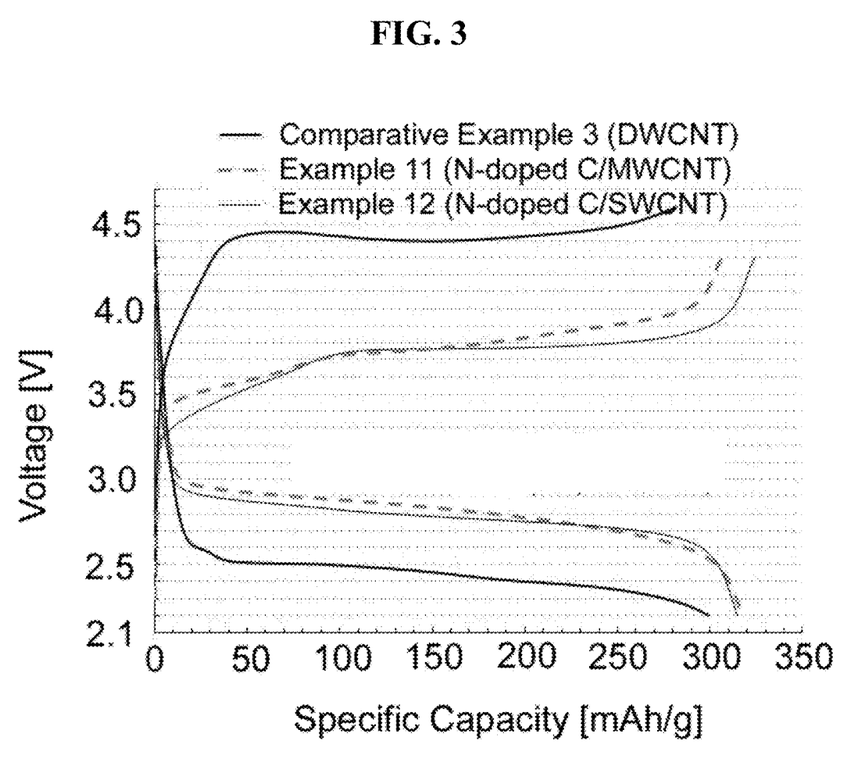
FIG. 3 is a graph of voltage (volts (V) vs. Li) versus specific capacity (milliampere hours per gram (mAh/g), based on the total weight of the composite material, binder, and oxygen) of a first charge and discharge cycles of the lithium air batteries prepared in Examples 11 and 12, and Comparative Example 3.

Results of the charging and discharging experiment at the fifth cycle are partially shown in Table 2 and FIG. 3. An energy efficiency during charging and discharging is calculated according to Equation 1 below. A unit weight with respect to discharging capacity is a weight of a positive electrode including a composite material, a binder, and oxygen.

Energy efficiency[%]=$E$(discharge)/$E$(charge)×100%      Equation 1

In Equation 1, E(charge) is an average voltage during charge and E(discharge) is an average voltage during discharge. The E(charge) and the E(discharge) are calculated by integrating a charge curve and a discharge curve in an electric capacity (x axis)-voltage(y axis) graph to obtain integrated values and then dividing the integrated value by maximum discharging capacity and maximum charging capacity, respectively.

TABLE 2

|  | Energy efficiency [%] | discharge capacity [mAh/g] |
|---|---|---|
| Comparative Example 3 | 56.5 | 299 |
| Example 11 | 75 | 318 |
| Example 12 | 75 | 315 |

As shown in Table 2, the lithium air batteries prepared in Examples 11 and 12 have energy efficiencies and discharge capacities that are surprisingly increased when compared to the lithium air battery prepared in Comparative Example 3, in spite of a low BET specific surface area. The energy efficiencies and the discharging capacities are increased due to the increased average pore sizes.

In addition, the lithium air batteries prepared in Examples 11 and 12 have energy efficiencies that are increased compared to an energy efficiency of 59.7% of a lithium air battery that is prepared by using nitrogen-doped CNT that is disclosed by Li et al., (Electrochemistry Communications 13 (2011) 668-672).

As described above, according to an embodiment, by using a porous carbonaceous composite material having a new structure, a lithium air battery may have improved energy efficiency and a reduced charge-discharge overvoltage.

It should be understood that the exemplary embodiments described therein should be considered in a descriptive sense only and not for purposes of limitation. Descriptions of features, advantages, or aspects within each embodiment should be considered as available for other similar features or aspects in other embodiments.

What is claimed is:

1. A porous carbonaceous composite material comprising:
a core comprising a carbon nanotube; and
a coating layer on the core, the coating layer consisting of a carbonaceous material comprising a hetero element, wherein the hetero element comprises at least one element selected from Groups 13 to 16 of the Periodic Table of the Elements.

2. The porous carbonaceous composite material of claim 1, wherein the coating layer is disposed on at least a portion of the core.

3. The porous carbonaceous composite material of claim 2, wherein the core comprises:
a plurality of carbon nanotubes which define a pore between the plurality of carbon nanotubes.

4. The porous carbonaceous composite material of claim 1, wherein the carbonaceous material comprises at least one selected from a carbon nanoparticle, mesoporous carbon, a carbon nanotube, carbon nanofiber, a carbon nanosheet, a carbon nanorod, a carbon nanobelt, and a combination thereof.

5. The porous carbonaceous composite material of claim 4, wherein an average diameter of the carbon nanoparticle is about 2 nanometers to about 900 nanometers.

6. The porous carbonaceous composite material of claim 1, wherein the carbonaceous material is a sintered product of a carbon precursor comprising a hetero element.

7. The porous carbonaceous composite material of claim 1, wherein the hetero element comprises at least one selected from nitrogen, sulfur, phosphorus, selenium, tellurium, and boron.

8. The porous carbonaceous composite material of claim 2, wherein an amount of the hetero element in the coating layer is about 30 weight percent or less.

9. The porous carbonaceous composite material of claim 1, wherein the carbon nanotube comprises at least one selected from a single walled carbon nanotube, a dual walled carbon nanotube, and a multi walled carbon nanotube.

10. The porous carbonaceous composite material of claim 1, wherein the carbon nanotube comprises at least one selected from a semiconducting carbon nanotube and a metallic carbon nanotube.

11. The porous carbonaceous composite material of claim 1, wherein an average pore size of the porous carbonaceous composite material when measured by the Brunauer-Emmett-Teller method is about 7 nanometers to about 30 nanometers.

12. The porous carbonaceous composite material of claim 1, wherein a specific surface area of the porous carbonaceous composite material when measured by the Brunauer-Emmett-Teller method is about 45 $m^2/g$ to about 900 $m^2/g$.

13. A positive electrode comprising:
the porous carbonaceous composite material of claim 1; and
a binder,
wherein the positive electrode is effective to reduce oxygen.

14. The positive electrode of claim 13, wherein an average pore size of the positive electrode when measured by a Brunauer-Emmett-Teller method is about 10 nanometers to about 30 nanometers.

15. The positive electrode of claim 13, wherein a specific surface area of the positive electrode when measured by the Brunauer-Emmett-Teller method is about 50 $m^2/g$ to about 400 $m^2/g$.

16. The positive electrode of claim 13, wherein the positive electrode further comprises an oxygen oxidation/reduction catalyst.

17. The positive electrode of claim 16, wherein the oxygen oxidation/reduction catalyst comprises at least one selected from a metal, a metal oxide, and an organometallic compound.

18. The positive electrode of claim 17, wherein the metal comprises at least one selected from cobalt, nickel, iron, gold, silver, platinum, ruthenium, rhodium, osmium, iridium, palladium, copper, manganese, titanium, vanadium, tungsten, molybdenum, niobium, and an alloy thereof.

19. The positive electrode of claim 17, wherein the metal oxide comprises at least one selected from manganese oxide, cobalt oxide, iron oxide, zinc oxide, nickel oxide, vanadium oxide, molybdenum oxide, niobium oxide, titanium oxide, tungsten oxide, chrome oxide, and a combination thereof.

20. A lithium air battery comprising:
a negative electrode capable of intercalating and deintercalating lithium ions;

the positive electrode of claim 13; and an electrolyte disposed between the negative electrode and the positive electrode.

21. A method of preparing a porous carbonaceous composite material, the method comprising:

contacting a carbon nanotube and a carbon precursor comprising a hetero element to prepare a mixture; and sintering the mixture to prepare the porous carbonaceous composite material, wherein the porous carbonaceous composite material comprises a core comprising a carbon nanotube, and a coating layer on the core, the coating layer consisting of a carbonaceous material comprising the hetero element, wherein the hetero element comprises at least one element selected from Groups 13 to 16 of the Periodic Table of the Elements.

22. The method of claim 21, wherein the contacting comprises mixing the carbon nanotube and the carbon precursor comprising the hetero element in a solution, and drying the solution.

23. The method of claim 21, wherein the carbon precursor comprising the hetero element comprises at least one selected from a substituted or unsubstituted aromatic cyclic compound and a substituted or unsubstituted aromatic heterocyclic compound.

24. The method of claim 21, wherein the carbon precursor comprising the hetero element comprises at least one selected from quinoxaline, hemin, p-toluene sulfonic acid, porphyrin, cobalt-tetramethoxy-phenylporphyrin, iron-tetramethoxy-phenylporphyrin, phthalocyanine, cobalt-phthalocyanine, iron-phthalocyanine, pyrazine, bipyridine, and a combination thereof.

25. The method of claim 21, wherein the sintering is performed for about 1 hour to about 72 hours under an inert atmosphere at a temperature of about 400° C. to about 1000° C.

26. The method of claim 21, further comprising after the sintering refining the porous carbonaceous composite material which is a product of the sintering.

27. The method of claim 26, wherein the refining comprises immersing the porous carbonaceous composite material in aqueous hydrofluoric acid, aqueous hydrochloric acid, aqueous nitric acid, aqueous hydrogen peroxide, aqueous sulfuric acid, or a combination thereof.

* * * * *